(12) United States Patent
Nishida et al.

(10) Patent No.: US 7,408,738 B2
(45) Date of Patent: Aug. 5, 2008

(54) MAGNETIC RECORDING SYSTEM WITH IMPROVED MAGNETIC SHIELD

(75) Inventors: Yasutaka Nishida, Tokyo (JP); Ikuya Tagawa, Kanagawa (JP); Toshihiko Shimizu, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 353 days.

(21) Appl. No.: 11/104,977

(22) Filed: Apr. 12, 2005

(65) Prior Publication Data

US 2005/0225895 A1    Oct. 13, 2005

(30) Foreign Application Priority Data

Apr. 12, 2004 (JP) .............................. 2004-116825

(51) Int. Cl.
*G11B 33/14* (2006.01)
(52) U.S. Cl. .................................................. 360/97.02
(58) Field of Classification Search ........................ None
See application file for complete search history.

(56) References Cited

U.S. PATENT DOCUMENTS 5,844,746 A * 12/1998 Uwabo et al. ............ 360/97.02

2002/0034029 A1    3/2002    Aoyagi et al.

FOREIGN PATENT DOCUMENTS

| JP | 05-041075 | 2/1993 |
| JP | 06-036275 | 2/1994 |
| JP | 06-068461 | 3/1994 |
| JP | 2003-123210 | 4/2003 |

* cited by examiner

*Primary Examiner*—David D Davis
(74) *Attorney, Agent, or Firm*—Townsend and Townsend and Crew LLP; Darren Gold

(57) ABSTRACT

Embodiments of the invention efficiently improve the stray field robustness without changing the size or weight of the drive on a large scale. Because a stray field concentrates on a magnetic field element, a symptom in which already recorded data is erased is prevented. According to one embodiment, in a magnetic recording system that uses a perpendicular recording medium having a soft magnetic under layer, a soft magnetic shield is provided on an upper part and a side of a slider on which a magnetic head is mounted, and a distance C between the shield and the medium is made smaller than a distance A or B between the shield and the slider.

20 Claims, 8 Drawing Sheets

(a)

(b)

(c)

(a)

(b)

(prior art)

MAGNETIC RECORDING SYSTEM WITH IMPROVED MAGNETIC SHIELD

CROSS-REFERENCES TO RELATED APPLICATIONS

This application claims priority from Japanese Patent Application No. JP2004-116825, filed Apr. 12, 2004, the entire disclosure of which is incorporated herein by reference.

BACKGROUND OF THE INVENTION

The present invention relates to a magnetic recording system, and, particularly to a magnetic recording system provided with double-layered perpendicular media having a soft magnetic under layer and a single pole type write head.

To advance the high recording density of a magnetic disk drive, a double-layered perpendicular recording system is considered advantageous in which double-layered perpendicular media having a recording layer and a soft magnetic under layer, and a magnetic head which mounts a single pole type write head are combined. The single pole type write head is provided with a main-pole, a return-pole, and a coil for generating a write field applied from the main-pole to the double-layered perpendicular media. Moreover, the single pole type write head is usually fabricated in one body together with a read head which arranges a magneto-resistive effect element between a pair of regenerated shields. The double-layered perpendicular media have the soft magnetic under layer, the recording layer, and a protective layer formed on a substrate. Also in some cases, the double-layered perpendicular media may insert a non-magnetic layer between the recording layer and the soft magnetic under layer, or between the soft magnetic under layer and the substrate for the purpose of improving the crystalline of the upper layer and film adhesion. As an applicable composition, the single pole type write head provides a soft-magnetic material in the vicinity of the main-pole to change recording field distribution. In this description, a magnetic pole for generating a magnetic field in which magnetization is finally formed on the recording medium is defined as the main-pole.

In a conventional longitudinal magnetic recording system, data is written to the medium using the magnetic field leaked from a write head gap. On one hand, in the case of using the double-layered perpendicular media, because a magnetic flux generated from a recording element flows into the soft magnetic under layer, the recording field applied to the recording layer increases, and this characteristic is an advantage for high density. On the other hand, when a magnetic field is applied from the outside of the drive, as shown in FIG. 14, the magnetic flux concentrates on the magnetic head/soft magnetic under layer, and there is the possibility of an extremely large magnetic field being generated in comparison with an externally applied magnetic field, directly under the main-pole of the magnetic head. When a stray field concentrates on the magnetic head in this manner, the erasure of recorded data or the deterioration of signal quality occurs. There is the possibility of this problem being reduced due to the structure/magnetic property of the magnetic head and the structure/magnetic property of the soft magnetic under layer. However, because a double-layered perpendicular recording system is more sensitive to an external field than the conventional longitudinal magnetic recording system, this problem cannot be prevented theoretically in the double-layered perpendicular recording system.

To prevent this problem, it is proposed heretofore that a soft magnetic shield is added to the entirety or a part of the drive. Even in either case, the object is to bypass the magnetic flux by the external field via the shield by adding the shield, and reduce the magnetic flux flowing into the head and recording medium inside the drive. The shield in this case uses the outside of the drive or, at least, the outside of the head and the entirety of the medium as a circumventing path of the magnetic flux.

BRIEF SUMMARY OF THE INVENTION

A double-layered perpendicular recording system is sensitive to an external field theoretically and low in stray field robustness. Accordingly, the double-layered perpendicular recording system is limited in taking measures for these characteristics by improvements, such as the structure and magnetic property of a magnetic head/recording medium. Moreover, in a method of adding a shield to the outside of a drive, because a circumventing distance is long, magnetic resistance increases, and a magnetic flux that leaks into a cabinet will increase. To prevent this problem and obtain a satisfactory effect, the shield must be thickened. Otherwise, the drive is made large-scale or increases weight, which will cause a problem.

A feature of the present invention is to efficiently improve the stray field robustness of the double-layered perpendicular recording system without changing the size or weight of the drive on a large scale.

According to one aspect, the present invention provides a soft magnetic shield for covering the upper part and the trailing side in the movable range of a magnetic head mounted on a slider. In this case, the shape or arrangement of the soft magnetic shield is decided so that the shortest distance between the soft magnetic shield and the magnetic recording surface can be shorter than the shortest distance between the soft magnetic shield and the slider. By providing the soft magnetic shield of such a structure, a stray field is guided from the soft magnetic shield to the soft magnetic under layer of the magnetic recording medium, and concentrated by the magnetic head. Accordingly, because the stray field is not applied to the magnetic recording medium, a problem, such as the erasure of recorded data by the stray field, will not occur.

The soft magnetic shield can also be provided on both sides of the magnetic recording medium. That is, by providing the same soft magnetic shield in opposition on both sides of the magnetic recording medium, the soft magnetic shield can cope with even a drive having a head on both sides, and a magnetic flux flowing into a head element can be reduced effectively. Moreover, in the case of the drive having plural magnetic recording media, a soft-magnetic material is provided between the respective magnetic recording media. By arranging the soft-magnetic material almost directly under the soft material shield of the uppermost and lowermost surfaces, the stray field is prevented from concentrating on the magnetic head installed between the magnetic recording media, and the same effect can be obtained. In this case, the soft-magnetic material provided between the two magnetic recording media can set the shape or arrangement so that the distance between the soft-magnetic material and another soft-magnetic material opposed to each other sandwiching the magnetic recording medium or the soft magnetic shield can be made smaller than the shortest distance between the soft-magnetic material and any of plural sliders. Consequently, the flow of the magnetic flux into the magnetic head mounted on the slider can be reduced.

According to the present invention, stray field robustness in the case of using a double-layered perpendicular recording medium having a soft magnetic under layer can be improved, and a magnetic recording system of high reliability can be proposed.

DETAILED DESCRIPTION OF THE INVENTION

Embodiments of the present invention are described below with reference to the drawings. To facilitate understanding, in the following drawings, the same functional part is described appending the same symbol.

Figure 1:
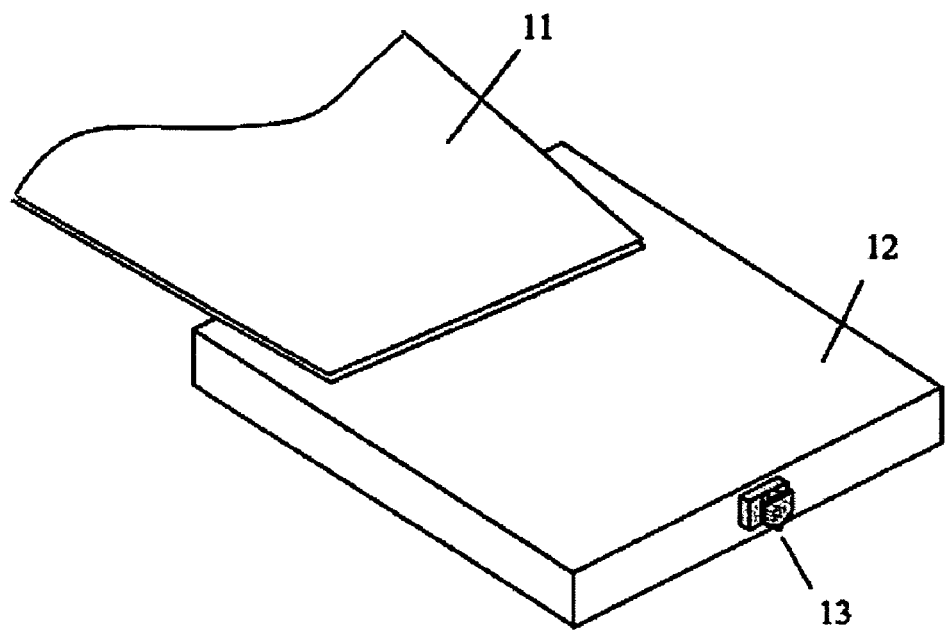
FIG. 1 shows an example of structures of a slider and a magnetic head of a magnetic recording system.
Figure 2:
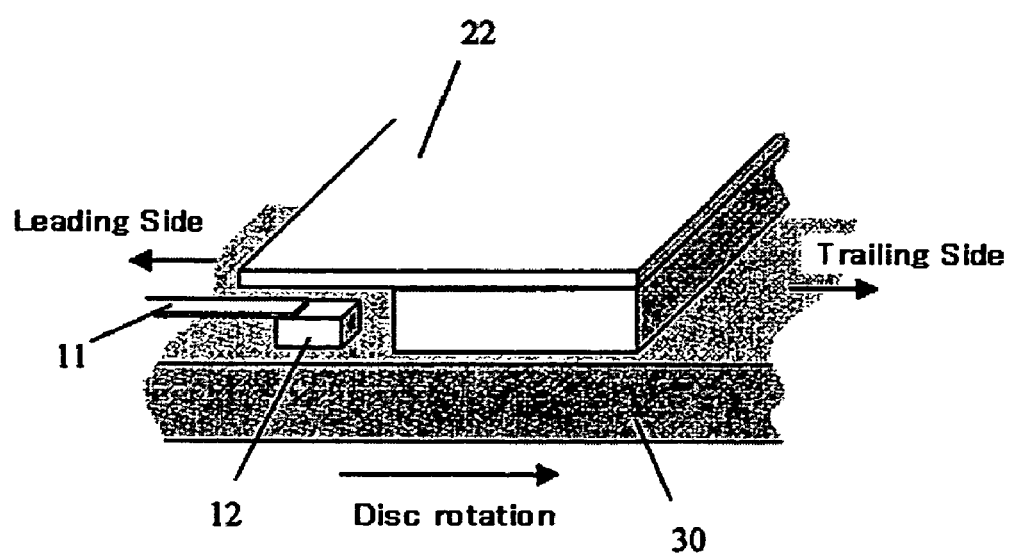
FIG. 2 shows the structure of a soft magnetic shield according to an embodiment of the present invention.

A magnetic disk drive according to an embodiment of the present invention is provided with a magnetic disk having a recording layer and a soft magnetic under layer, and a suspension for supporting a slider in which a magnetic head is mounted on the tip. As shown in FIG. 1, an element for a magnetic head 13 is formed on the tip (rear end) of a slider 12 supported by a suspension 11. The magnetic head 13 is provided with a magneto-resistive effect element sandwiched between a pair of regenerated shields as a read head, and provided with a single pole type write head having a main-pole and a return-pole as a write head. The present embodiment provides a sectional L-shaped soft magnetic shield 22 shown in FIG. 2 as an example in the vicinity of the slider 12 on which the magnetic head positioned on a magnetic disk 30 is mounted. The soft magnetic shield 22 allows a part thereof to be positioned upward the slider 12 and the remaining part to be positioned in opposition to the rear end (trailing side) of the slider and the magnetic disk 30. The soft magnetic shield is arranged upward the movable range in the radial direction of disk of the slider 12.

Figure 3:
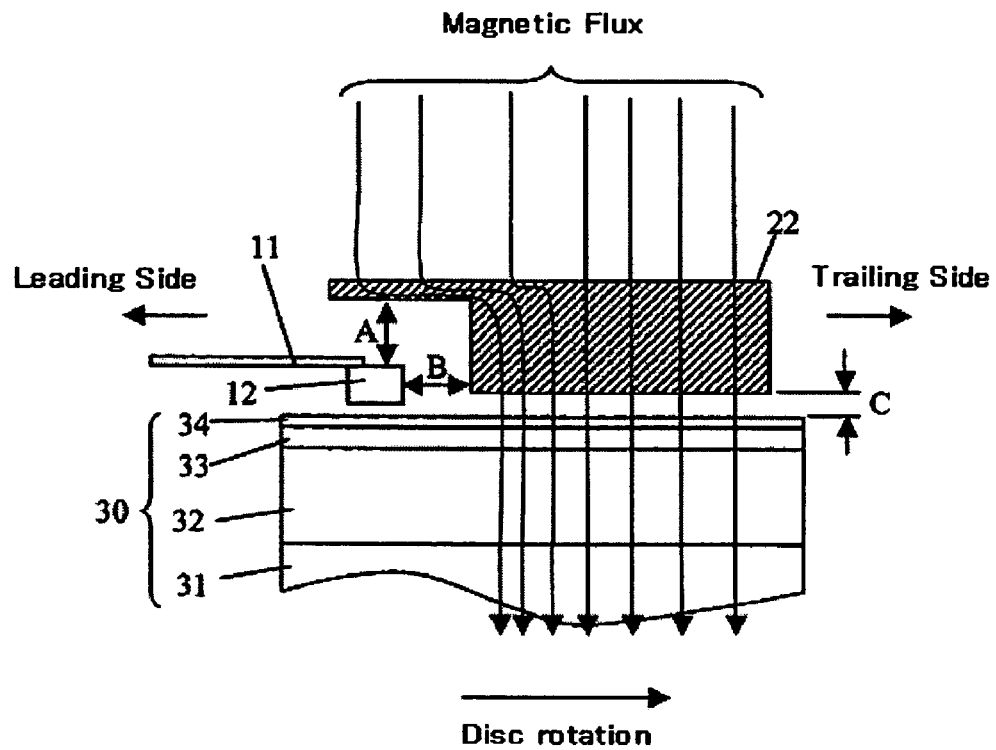
FIG. 3 shows a flow of a magnetic flux in the soft magnetic shield according to an embodiment of the present invention.

FIG. 3 is a sectional schematic depiction showing the slider 12 and the soft magnetic shield 22 positioned on the magnetic disk 30. The magnetic disk 30 has a soft magnetic under layer 32, a recording layer 33, and a protective layer 34 formed on a substrate 31. As shown in FIG. 3, the lower surface of the soft magnetic shield 22 facing to the rear end (trailing side) of the slider 12 is positioned in the vicinity of the surface of the magnetic disk 30. Hereupon, the distance (spacing C) between the soft magnetic shield 22 and the magnetic disk surface is made smaller than the distance (spacing A or B) between the soft magnetic shield 22 and the slider 12. Accordingly, a magnetic flux flowing into the soft magnetic shield 22 becomes easy to flow into the soft magnetic under layer 32 of the magnetic disc 30 via the soft magnetic shield 22. The magnetic flux flowing into the magnetic head provided on the rear end of the slider 12, in particular, the magnetic flux flowing into the main-pole of a single pole type write head, can be reduced efficiently.

Embodiment 1

An embodiment is described in which a soft magnetic shield of the present invention is applied to a magnetic recording system that uses a double-layered perpendicular recording medium having a recording layer of perpendicular magnetic anisotropy and a soft magnetic under layer, and a single pole type write head and a magneto-resistive type read head.

Figure 4:
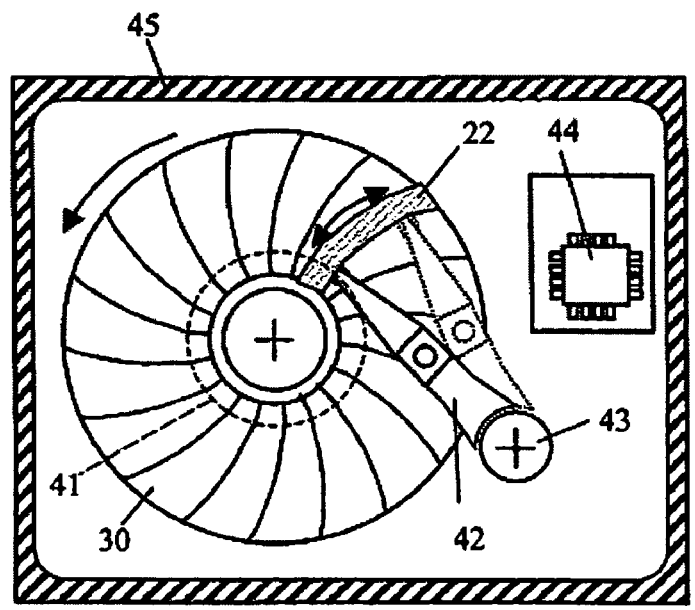
FIG. 4 is a schematic depiction of the top surface of the magnetic recording system according to an embodiment of the present invention.

FIG. 4 is a schematic depiction showing the top surface of the magnetic recording system according to an embodiment of the present invention. The magnetic disk 30, a motor 41 for rotating the magnetic disk, a suspension arm 42 for holding a slider, a rotary actuator 43 for driving the suspension arm 42, and a signal processing unit 44 are installed in a cabinet 45. The magnetic recording system performs the read and write of a magnetizing signal by a magnetic head at the predetermined position on the magnetic disk (magnetic recording medium) 30 that is rotated by the motor 41. The magnetic head is mounted on the slider fixed to the tip of the suspension arm 42. The magnetic head can select a position (track) in the radial direction of magnetic disk of the magnetic head by driving the rotary actuator 43 and moving the suspension arm 42 rotationally. A write signal into the magnetic head and a read signal from the magnetic head are processed through the signal processing unit 44. The slider and the magnetic head move on the magnetic disk 30 circularly using a rotating shaft of the rotary actuator 43 as the shaft. Accordingly, the soft magnetic shield 22 of this embodiment is arranged circularly along the track on which the slider moves.

Figure 5:
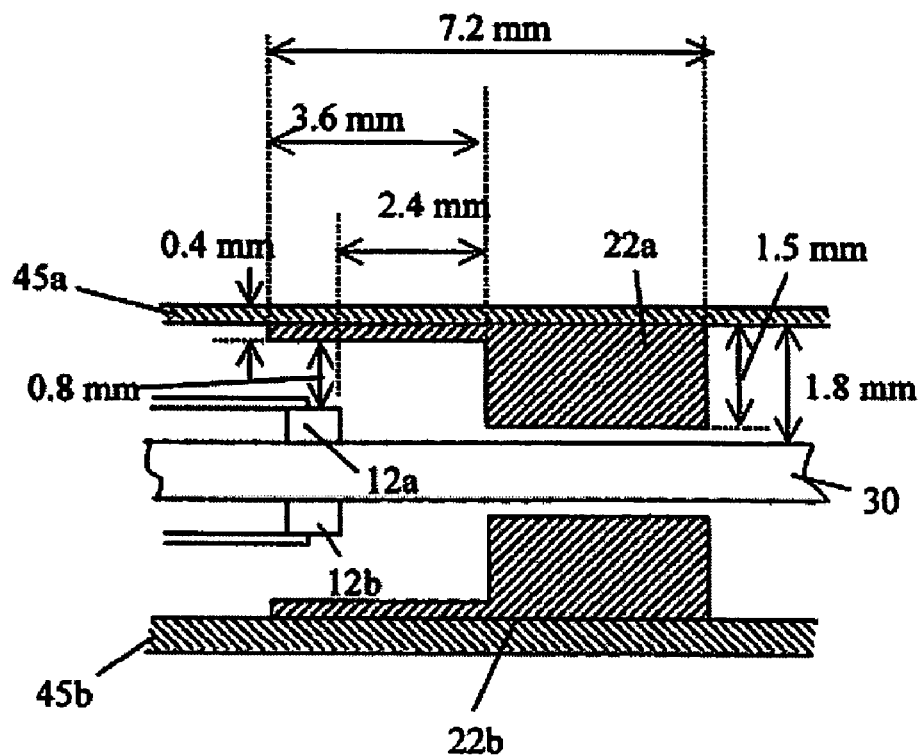
FIG. 5 is a schematic depiction showing a section in the vicinity of the slider on which the magnetic head is mounted.

FIG. 5 is a schematic depiction showing the section in the vicinity of the slider on which the magnetic disk is mounted. This embodiment is an example of the composition of a magnetic recording system provided with one magnetic disk and two magnetic heads. Sliders 12a, 12b and soft magnetic shields 22a, 22b on which the magnetic head is mounted are arranged on both sides of the magnetic head 30. The soft magnetic shield 22a is mounted on a drive cabinet cover 45a and the soft magnetic shield 22b is mounted on the drive cabinet bottom base 45b. The soft magnetic shields 22a, 22b have an L-shaped sectional shape. Magnetic SUS is used as a material of the soft magnetic shield. In addition to the magnetic SUS, various soft magnetic materials, such as silicon steel and permalloy, can also be used.

FIG. 5 also shows an example of dimensions of the soft magnetic shield. In the magnetic recording system used as this embodiment, the distance between the cabinet cover 45a and the surface of the magnetic disk 30 in the vicinity of the magnetic head is 1.8 mm, and the height of the sliders 12a, 12b on which the magnetic head is mounted is approximately 0.6 mm. To obtain the effect of the present invention, the thickness of the thin parts of the soft magnetic shields 22a, 22b is about 0.4 mm, and the thickness of the thick parts is about 1.5 mm. The shortest distance between the soft magnetic shield and the slider top surface is about 0.8 mm, and the distance between the soft magnetic shield and the magnetic disk surface is about 0.3 mm. Moreover, the width in the circumferential direction of disk of the top surface (surface far from the magnetic disk) of the soft magnetic shields 22a, 22b is about 7.2 mm, and the width of the circumferential direction of disk of the bottom base (surface opposed to the magnetic disk) is about 3.6 mm. In the case of reducing the area of the bottom base of the soft magnetic shield extremely in comparison with the area of the top surface, the concentration of a magnetic flux by the soft magnetic shield occurs, and the erasure of recorded data by the soft magnetic shield may occur. The area ratio is 1 to 2 in this case.

Further, in this embodiment, the field intensity applied to a magnetic head element can be reduced up to approximately 65% against external field intensity according to the magnetic shield effect of the soft magnetic shield.

Figure 6:
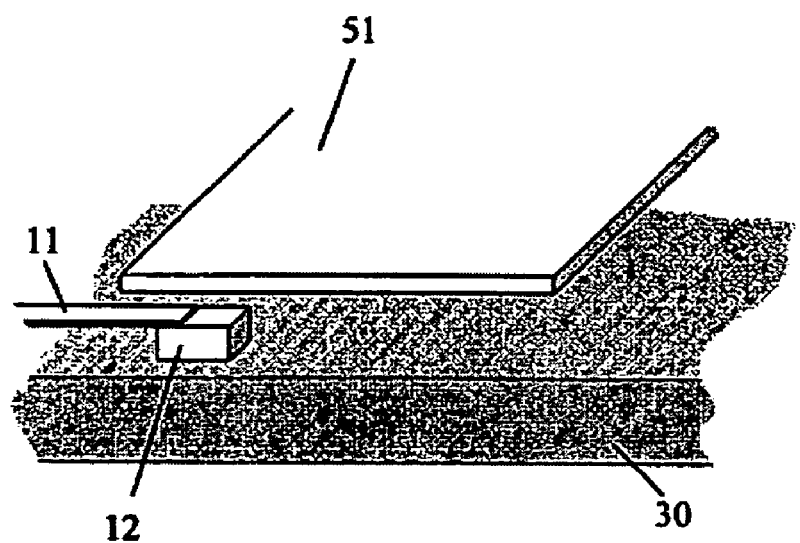
FIG. 6 is a schematic depiction in the vicinity of the magnetic head on which a plate type soft magnetic shield is mounted.
Figure 7:
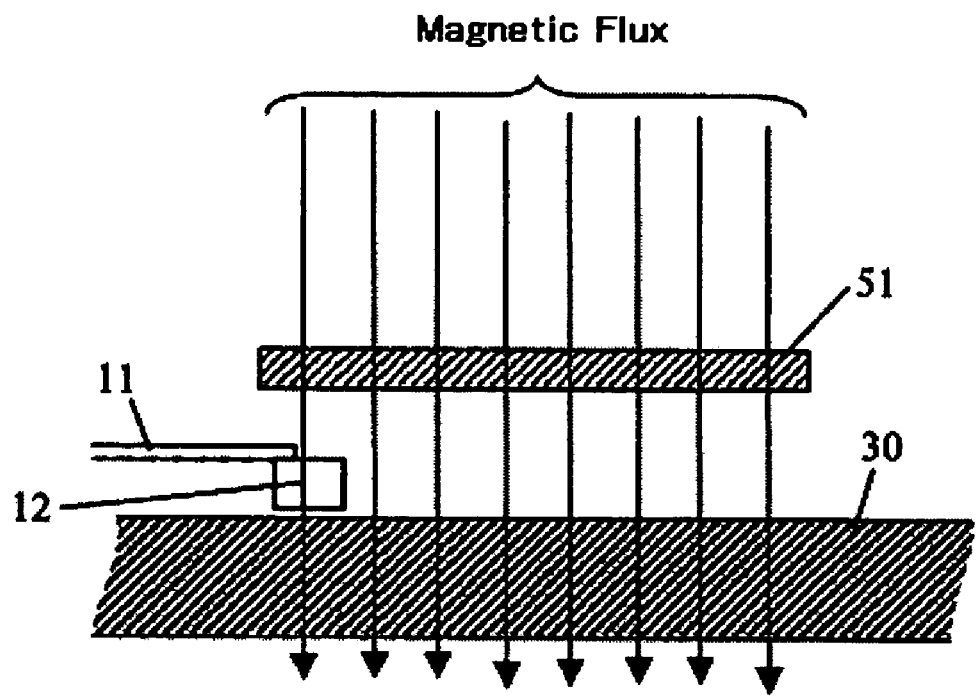
FIG. 7 is a schematic depiction for describing the flow of the magnetic flux in the plate type soft magnetic recording system.

In this embodiment, in the case of using a flat plate type soft magnetic shield 51 as shown in FIG. 6, because there is no easy-to-flow path of a magnetic flux, the magnetic flux that reached the soft magnetic shield 51 passes through the soft magnetic shield 51, as shown in the sectional view of FIG. 7. The magnetic flux also enters the magnetic head element mounted on the slider 12. To make the magnetic flux hard to flow into the magnetic head, it is effective that a soft magnetic shield of the structure shown in the present embodiment, that is, the soft magnetic shield in which the shortest distance between the soft magnetic shield and the magnetic disk surface is shorter than the shortest distance between the soft magnetic shield and the slider is provided.

Embodiment 2

An example of the composition of a magnetic recording system provided with two magnetic disks and four magnetic disks is described. The magnetic head, magnetic disk, and shield material are the same as those in Embodiment 1.

Figure 8:
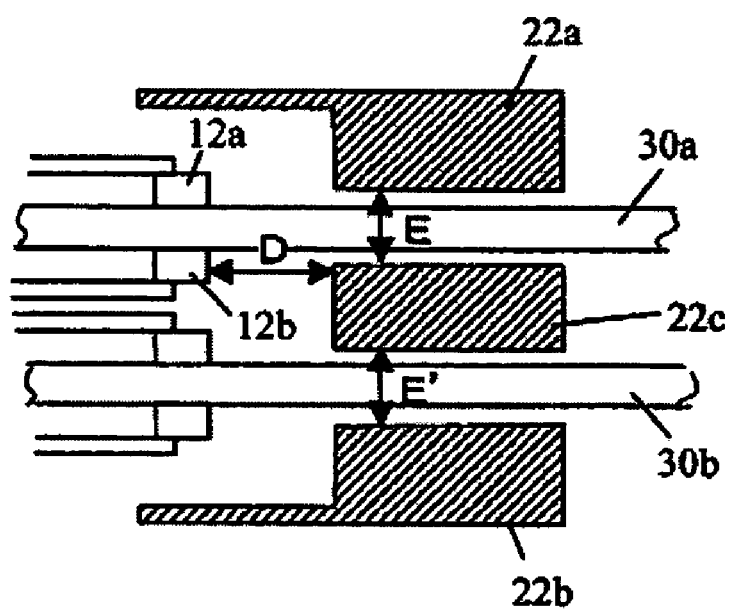
FIG. 8 is a schematic depiction showing the section in the vicinity of the slider of another example of the magnetic recording system according to an embodiment of the present invention.
Figure 9:
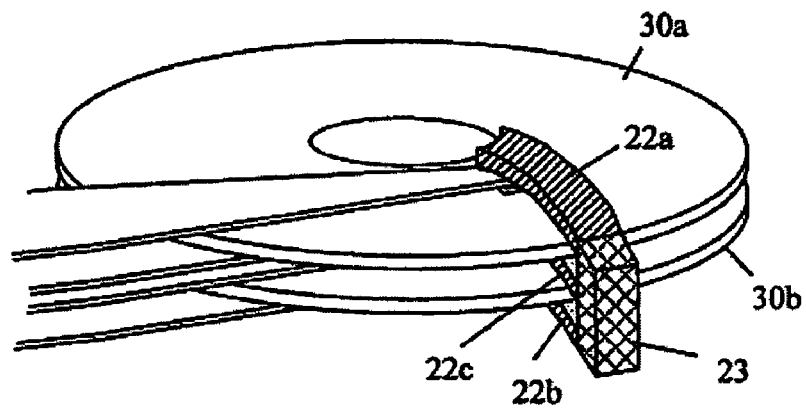
FIG. 9 is a perspective view showing the arrangement of the soft magnetic shield to the magnetic disk and the slider.

FIG. 8 is a schematic depiction showing the section in the vicinity of a slider on which the magnetic head is mounted, and FIG. 9 is a perspective view showing the arrangement of the soft magnetic shield to the magnetic disk and the slider. As shown in FIG. 8, the soft magnetic shields 22a, 22b of the uppermost and lowermost surfaces have a structure whose section is of an L shape in the same manner as Embodiment 1, and a soft magnetic shield 22c arranged between two magnetic disks 30a, 30b has a structure whose section is of an rectangle. Moreover, in this embodiment, as shown in FIG. 9, to support the soft magnetic shield 22c arranged between the magnetic disks, a non-magnetic pillar 23 is provided to obtain a shield of a comb-shaped structure. Thus, the soft magnetic shields 22a,22b, 22c are positioned so that the shields can mutually overlap in the direction of rotating shaft of the magnetic disks 30a, 30b. In this case, the shortest distance E or E' between the soft magnetic shield 22c and the soft magnetic shields 22a, 22b is set shorter than the shortest distance D between the soft magnetic shield 22c and a slider 12b.

Consequently, a stray field passes through the soft magnetic shield 22a, 22c, 22b, and it is possible to reduce a magnetic flux of the stray field that flows into the magnetic head mounted on the slider 12b.

Further, in this embodiment, the non-magnetic pillar is used to support the soft magnetic shield 22c, but the pillar of a soft magnetic material can also be used. Moreover, in this embodiment, two magnetic disks and four magnetic heads are used. Even when there are more magnetic disks and heads, the same effect can be realized by repeating the same structure.

Embodiment 3

Next, an example of the composition of a magnetic recording system having one magnetic disk and one magnetic head is described.

Figure 10:
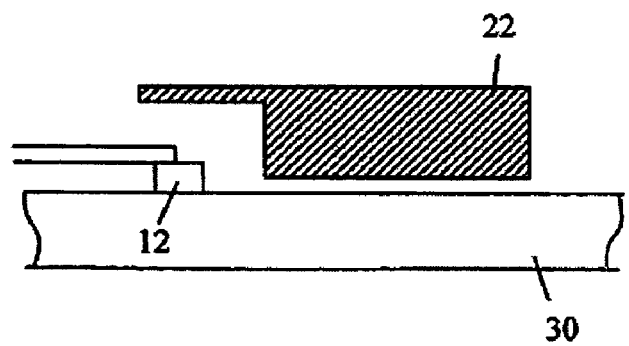
FIG. 10 is a schematic depiction showing the section in the vicinity of the slider of another example of the magnetic recording system according to an embodiment of the present invention.
Figure 11:
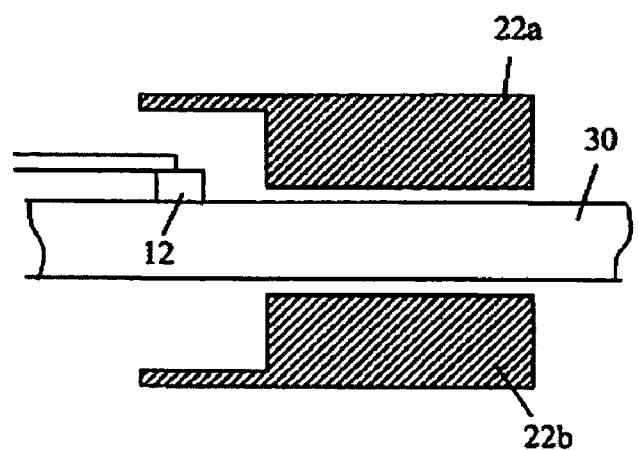
FIG. 11 is a schematic depiction showing the section in the vicinity of the slider of another example of the magnetic recording system according to an embodiment of the present invention.

FIG. 10 is a schematic depiction showing the section in the vicinity of a slider on which the magnetic head is mounted. In this embodiment, as shown in FIG. 10, the soft magnetic shield 22 having the same shape as in Embodiment 1 is arranged only on the disk surface of the magnetic head side. Further, even in the case of one magnetic disk and one magnetic head, as shown in FIG. 11, the soft magnetic shields 22a, 22b can also be arranged on both sides of the magnetic disk 30.

Figure 12:
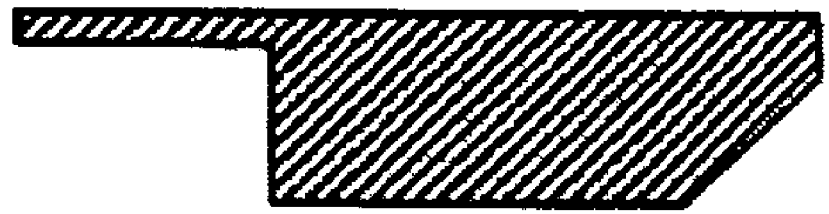
FIG. 12 shows examples of the soft magnetic shield according to an embodiment of the present invention.
Figure 12:
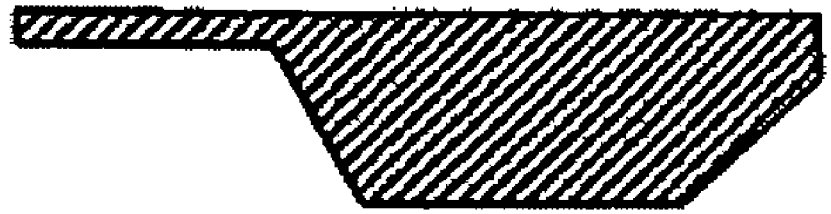
Figure 12:

FIG. 12 is a sectional schematic depiction showing another shape example of the soft magnetic shield. In the embodiment described above, all soft magnetic shields having L-shaped sections are used, but, as shown in FIGS. 12(a) and 12(b), an edge can also be made oblique or round for reasons of pneumatic force. Otherwise, as shown in FIG. 12(c), a soft magnetic shield can be fabricated by processing a plate type material. Even in these shield shapes, the present invention is effective as long as the shortest distance between the soft magnetic shield and the slider is bigger than the shortest distance between the soft magnetic shield and the magnetic disk.

Figure 13:
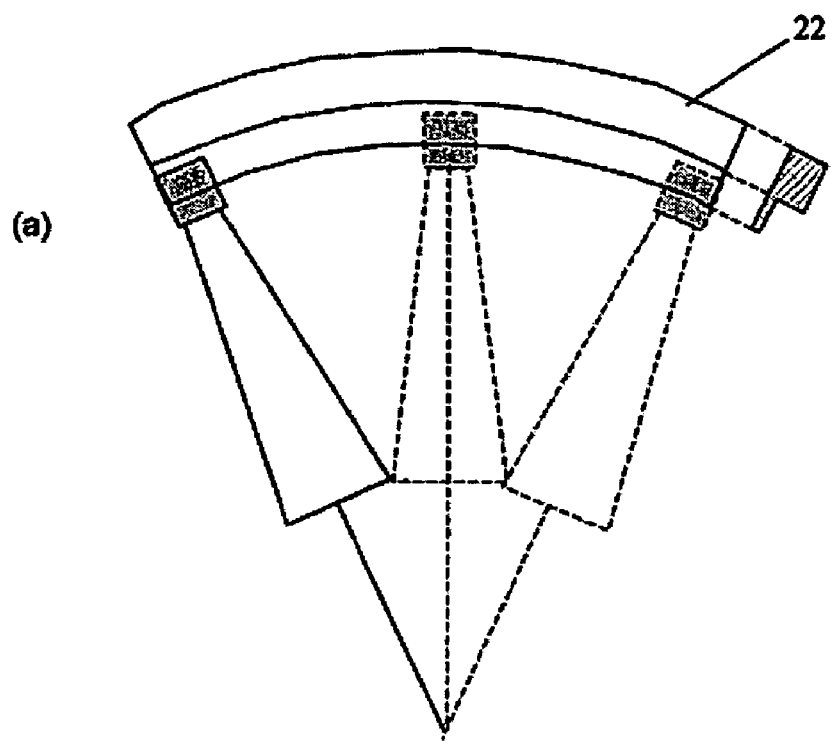
FIG. 13 shows additional examples of the soft magnetic shield according to an embodiment of the present invention.
Figure 13:
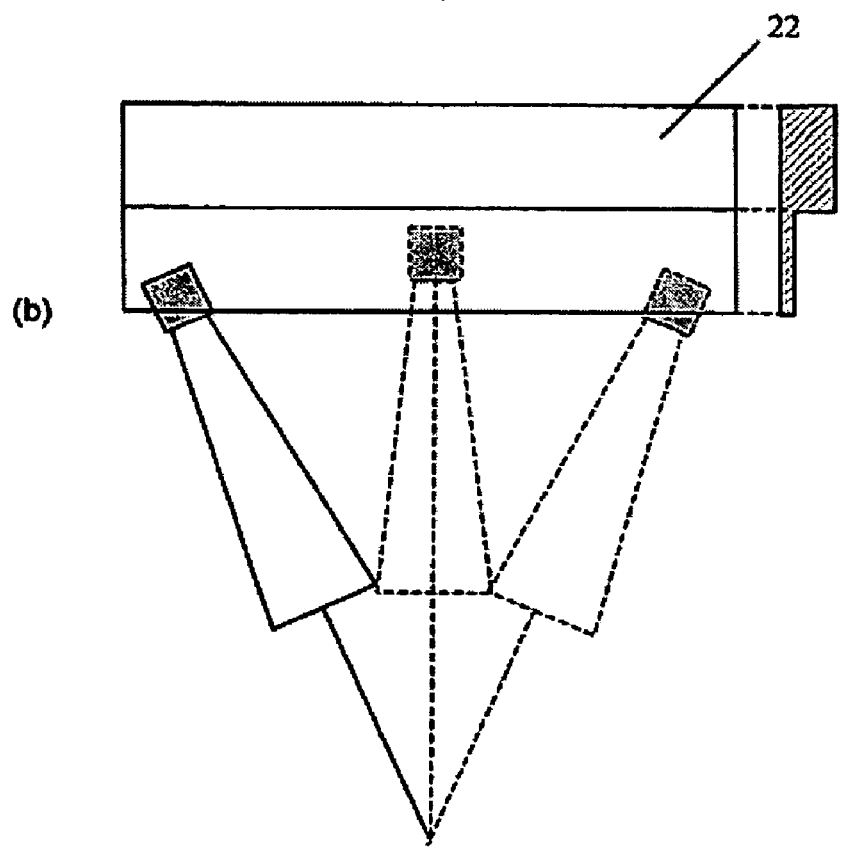
Figure 14:
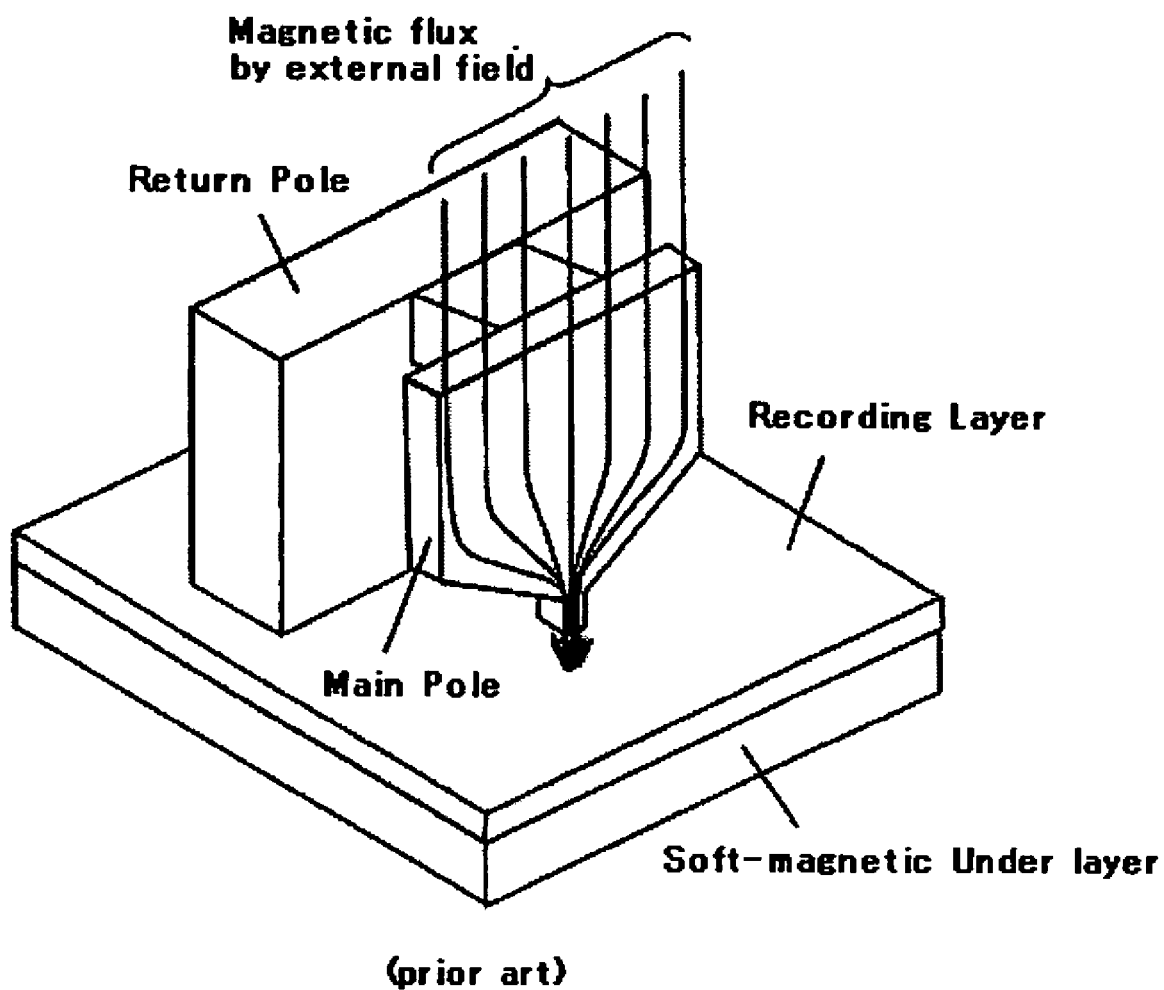
FIG. 14 shows external field concentration by a single pole type head in a double-layered perpendicular recording system.

Moreover, concerning the shape in the radial direction of disk of the soft magnetic shield, various arrangements or shapes, such as a circular one as shown in FIG. 13(a) and a linear one as shown in FIG. 13(b), may be considered. Moreover, a shape in which the shape is partly modified from a circle or a straight line may also be considered in the relationship with another structure in a drive. Also in either case, the present invention is effective as long as the shortest distance between the soft magnetic shield and the slider (magnetic head) is bigger than the shortest distance between the soft magnetic shield and the magnetic disk surface.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic recording system comprising:
   a magnetic recording medium provided with a recording layer and a soft magnetic under layer;
   a spindle motor to rotate said magnetic recording medium;
   at least one slider on which a magnetic head is mounted;
   a magnetic head actuator configured to drive said magnetic head in a radial direction of said magnetic recording medium; and
   a soft magnetic shield configured to cover an upper part and a trailing side in a movable range of said magnetic head, wherein the shortest distance between said soft magnetic shield and a surface of said magnetic recording medium is shorter than the shortest distance between said soft magnetic shield and any slider of the magnetic recording system.

2. The magnetic recording system according to claim 1, wherein said recording layer has perpendicular magnetic anisotropy, and said magnetic head has a single pole type write head.

3. The magnetic recording system according to claim 1, wherein said soft magnetic shield is provided on both sides of said magnetic recording medium.

4. The magnetic recording system according to claim 1, comprising a plurality of magnetic recording media, wherein a soft-magnetic material is provided respectively between adjacent magnetic recording media.

5. The magnetic recording system according to claim 4, wherein said soft-magnetic material allows the shortest distance between the soft-magnetic material and another soft-magnetic material opposed to each other sandwiching said magnetic recording medium or said soft magnetic shield to be shorter than the shortest distance between the soft-magnetic material and any slider.

6. The magnetic recording system according to claim 4, wherein said soft magnetic shield and said soft-magnetic material are arranged in a position in which both said soft magnetic shield and said soft-magnetic material mutually overlap in a direction of rotating shaft of said magnetic recording medium.

7. The magnetic recording system according to claim 4, further comprising a pillar coupled with the soft magnetic shield and the soft-magnetic material to support the soft-magnetic material.

8. The magnetic recording system according to claim 7, wherein the pillar comprises a soft magnetic material.

9. The magnetic recording system according to claim 7, wherein the pillar comprises a nonmagnetic material.

10. The magnetic recording system according to claim 1, wherein the soft magnetic shield is arranged circularly along a track on which the slider moves.

11. The magnetic recording system according to claim 1, wherein the soft magnetic shield is arranged linearly and generally tangentially with respect to a track on which the slider moves.

12. The magnetic recording system according to claim 1, wherein the soft magnetic shield has an L-shaped sectional shape.

13. A magnetic recording system comprising:
a magnetic recording medium including a recording layer and a soft magnetic under layer, the magnetic recording medium being rotatable;
a slider on which a magnetic head is mounted, the slider being movable generally in a radial direction of said magnetic recording medium; and
a soft magnetic shield configured to be spaced from the slider and to be disposed over an upper part of said magnetic head and to be disposed adjacent in a direction perpendicular to a trailing side in a movable range of said magnetic head,
wherein the shortest distance between said soft magnetic shield and a surface of said magnetic recording medium is shorter than the shortest distance between said soft magnetic shield and said slider.

14. The magnetic recording system according to claim 13, wherein said recording medium comprises a double-layered perpendicular recording medium.

15. The magnetic recording system according to claim 13, wherein said soft magnetic shield is provided on both sides of said magnetic recording medium.

16. The magnetic recording system according to claim 13, comprising a plurality of magnetic recording media, wherein a soft-magnetic material is provided respectively between adjacent magnetic recording media.

17. The magnetic recording system according to claim 16, wherein said soft-magnetic material allows the shortest distance between the soft-magnetic material and another soft-magnetic material opposed to each other sandwiching said magnetic recording medium or said soft magnetic shield to be shorter than the shortest distance between the soft-magnetic material and any slider.

18. The magnetic recording system according to claim 16, wherein said soft magnetic shield and said soft-magnetic material are arranged in a position in which both said soft magnetic shield and said soft-magnetic material mutually overlap in a direction of rotating shaft of said magnetic recording medium.

19. The magnetic recording system according to claim 13, wherein the soft magnetic shield is arranged circularly along a track on which the slider moves.

20. The magnetic recording system according to claim 13, wherein the soft magnetic shield is arranged linearly and generally tangentially with respect to a track on which the slider moves.

* * * * *